(12) United States Patent
Alibert

(10) Patent No.: US 6,621,961 B2
(45) Date of Patent: Sep. 16, 2003

(54) SELF-ALIGNMENT HYBRIDIZATION PROCESS AND COMPONENT

(75) Inventor: Guilhem J. M. Alibert, Savigny sur Orge (FR)

(73) Assignee: Corning Incorporated, Corning, NY (US)

(*) Notice: Subject to any disclaimer, the term of this patent is extended or adjusted under 35 U.S.C. 154(b) by 180 days.

(21) Appl. No.: 09/761,603

(22) Filed: Jan. 16, 2001

(65) Prior Publication Data

US 2001/0009597 A1 Jul. 26, 2001

(30) Foreign Application Priority Data

Jan. 25, 2000 (EP) .............................................. 00400201

(51) Int. Cl.$^7$ ................................................. G02B 6/42
(52) U.S. Cl. ............................. 385/52; 385/89; 385/91; 385/14; 385/130; 430/290; 430/321; 65/385; 65/425
(58) Field of Search ..................... 385/52, 14, 89–94, 385/129–131; 430/290, 321, 97, 280.1, 281.1; 65/385, 425

(56) References Cited

U.S. PATENT DOCUMENTS

| 5,182,782 A | * | 1/1993 | Tabasky et al. ................ 385/88 |
| 5,488,678 A | | 1/1996 | Taneya et al. ................ 385/14 |
| 5,902,715 A | | 5/1999 | Tsukamoto et al. ......... 430/290 |
| 6,017,681 A | | 1/2000 | Tsukamoto et al. ......... 430/321 |

FOREIGN PATENT DOCUMENTS

JP          03136346          6/1991

* cited by examiner

*Primary Examiner*—Robert H. Kim
*Assistant Examiner*—George Y. Wang
(74) *Attorney, Agent, or Firm*—Juliana Agon; Price, Heneveld, Cooper, DeWitt & Litton

(57) ABSTRACT

A method of forming a hybrid optical component includes the steps of masking and etching a pattern on a core layer of a planar optical component to define at least one alignment element and an optical element and subsequently overcladding the optical element such that a passive platform is formed which exposes a surface of the optical element such as a waveguide and an alignment element for receiving a mirror image alignment element formed on an active platform including an active device, such as a laser. Hybrid components include a passive platform having an alignment element formed therein and a waveguide for receiving an active platform with a mating mirror image alignment element and an active device which aligns with the waveguide when the platforms are mated. Such a fabrication method and resulting optical component provide a highly efficient, self-aligning passive and active component platforms which greatly reduce the cost of fabrication of hybrid optical circuits as well as improve their reliability and reduce their cost.

19 Claims, 7 Drawing Sheets

SELF-ALIGNMENT HYBRIDIZATION PROCESS AND COMPONENT

CROSS-REFERENCE TO RELATED APPLICATIONS

This is application claims the benefit of European Patent Application No. 00400201.0 filed on Jan. 25, 2000, the content of which is relied upon and incorporated herein by reference in its entirety, and the benefit of priority is hereby claimed.

BACKGROUND OF THE INVENTION

1. Field of the Invention

The present invention relates to planar optical devices and particularly to an alignment system for aligning active devices with planar, passive optical devices.

2. Technical Background

Optical networks used in the communications industry require many complex optical components, examples of which include NXM switches, gain-flattening filters, variable attenuators, and add-drop multiplexers. An efficient way to design such components is to use planar optical devices inasmuch as many optical functions can be implemented on the same substrate. Furthermore, active devices can be added to the planar platform in order to create hybrid components delivering many of the functions needed in optical networks in a relatively compact package used for switching, monitoring, wavelength multiplexing, demultiplexing, wavelength conversion, and the like.

One difficulty with manufacturing hybrid devices is the precise alignment of active devices such as semi-conductor lasers, photo diodes and the like with the passive devices, such as waveguides, couplers, and switches on the same substrate. In the past, active alignment has been employed where the optical performance of a hybrid component is monitored as the active device is physically moved into alignment until, for example, a semi-conductor laser is aligned with a passive silica waveguide. The output from the waveguide is monitored until its optimal output is detected and, at such time, the active device is affixed, such as by soldering, to the platform of the passive device. This method is extremely time consuming and requires a complex experimental set-up to perform such alignment.

Another method employed in the prior art is the use of alignment marks on, for example, an optical waveguide substrate and separate alignment marks on an active platform and the subsequent alignment of the respective alignment marks to one another when the active device platform is joined with the passive device platform. This too requires precise placement of alignment marks initially on both platforms and the subsequent precise alignment of the active and passive platforms during their joining and bonding.

There exists a need, therefore, for a system and resultant hybrid component in which an active device can be precisely aligned to a planar optical component of a passive platform such that the active device is precisely coupled to the component. As hybrid optical components become increasingly in demand and the number of optical functions implemented on a single wafer increases, so too does the need to realize efficient and precise alignment of passive and active optical devices.

SUMMARY OF THE INVENTION

The method and resultant structure of the present invention provides such precise alignment of hybrid components by forming alignment standoff elements on a passive platform which matingly receive the mirror image structure of an active platform containing, for example, an active element to be aligned a waveguide of the passive platform. The two platforms precisely self-align with one another without the need for experimental positioning of the active device with respect to the passive device or the utilization of indexing marks in an effort to align the passive and active platforms. The method of forming a hybrid device according to the present invention includes the steps of masking and etching on a core layer of a planar optical component to define at least one standoff alignment element and an optical element and subsequently overcladding the optical element such that a passive platform is formed which exposes an optical element such as a waveguide and standoff alignment element for receiving a mirror image alignment element of an active platform including an active device, such as a solid state laser.

Hybrid components embodying the present invention include a passive platform having at least one standoff alignment element and an optical component formed therein for receiving an active platform with a mating mirror image alignment element. Such a fabrication method and resulting optical component provide a highly efficient, self-aligning passive and active component platforms which greatly reduce the cost of fabrication of hybrid optical components as well as improve their reliability and reduce their cost.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
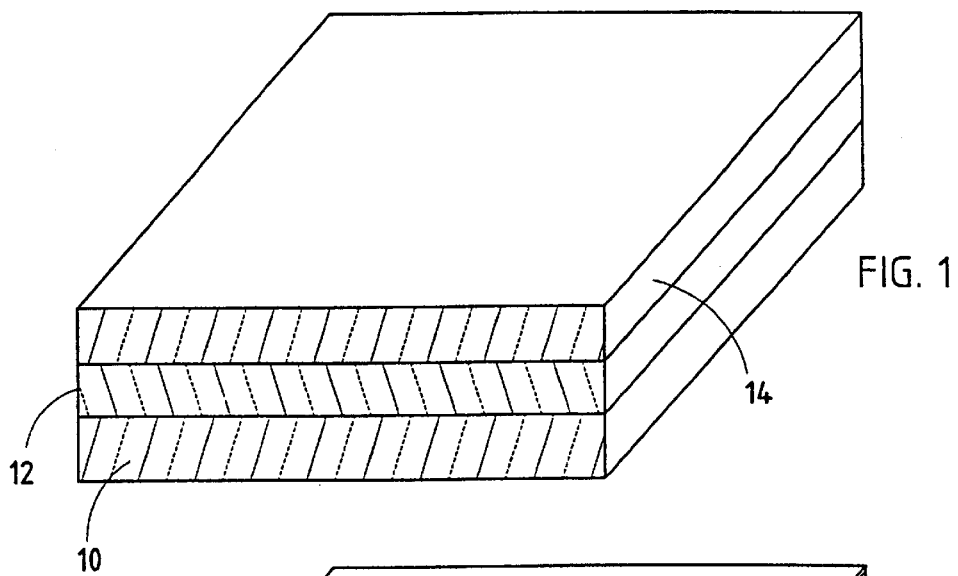
FIG. 1 is a schematic view of one step in the process of manufacturing a hybrid optical component according to the present invention.

Referring initially to FIG. 1, there is shown an initial preform of a planar optical circuit which in its entirety may include several optical components, such as switches, couplers, or multiplexers, and which includes both planar passive optical components and active devices, such as photo diodes, solid state lasers, and the like. For the purpose of clarity, however, the illustrations of the figures are of a single passive component and a single active component which form a part of an overall optical circuit. In FIG. 1, a section of a wafer for this optical circuit is shown and includes a planar layer of silica or silicon 10 forming a substrate, an under-clad layer 12 which is a silica ($S_iO_2$) and dopant, such as boron, germanium, or the like, resulting in an index of refraction at 1550 nm of from about 1.44 to about 1.55. Deposited in a conventional manner over the under-clad layer 12 is a core layer 14 of silica having a different but conventional dopant mixture providing an index of refraction of approximately 1% greater than that of the under-clad layer 12 and, for example, of from about 1.5 to about 1.6. The structure shown in FIG. 1 is conventionally formed by typical processes, such as flame hydrolysis deposition, plasma-enhanced chemical vapor deposition (PECVD) or the like of the under-cladding on the substrate and the core layer on the under-cladding.

Figure 2:
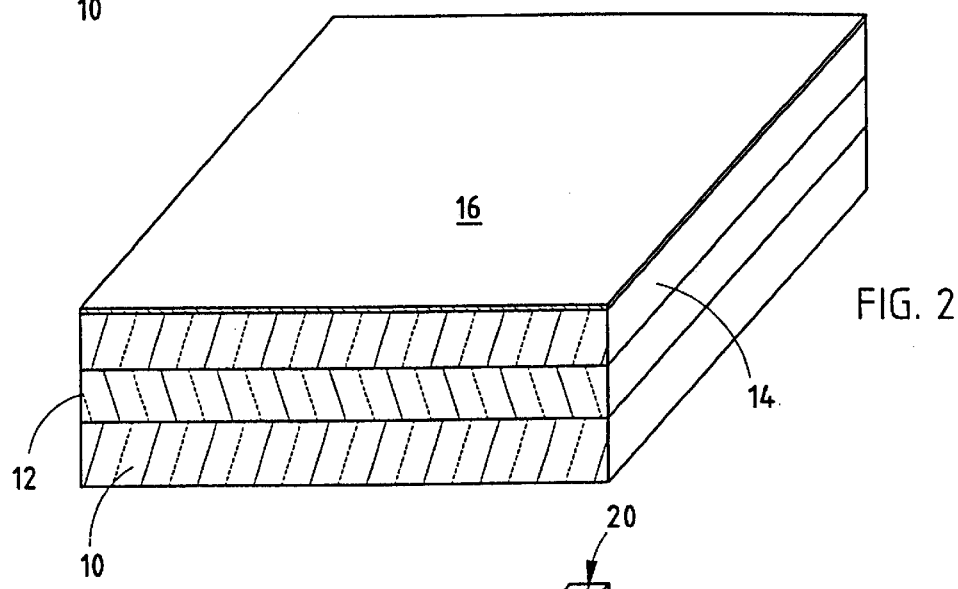
FIG. 2 is a schematic view of an additional step in the process of manufacturing a hybrid optical component according to the present invention.

The next step in the process is illustrated in FIG. 2 and involves the depositing by sputtering or evaporation of a metallic layer 16 onto the exposed surface of the core layer 14. The metallic layer may be any suitable conductive or semi-conductive material, such as aluminum, chromium, silicon, nickel or the like, having a deposition thickness of from about 0.2 to about 5 μm.

Figure 3:
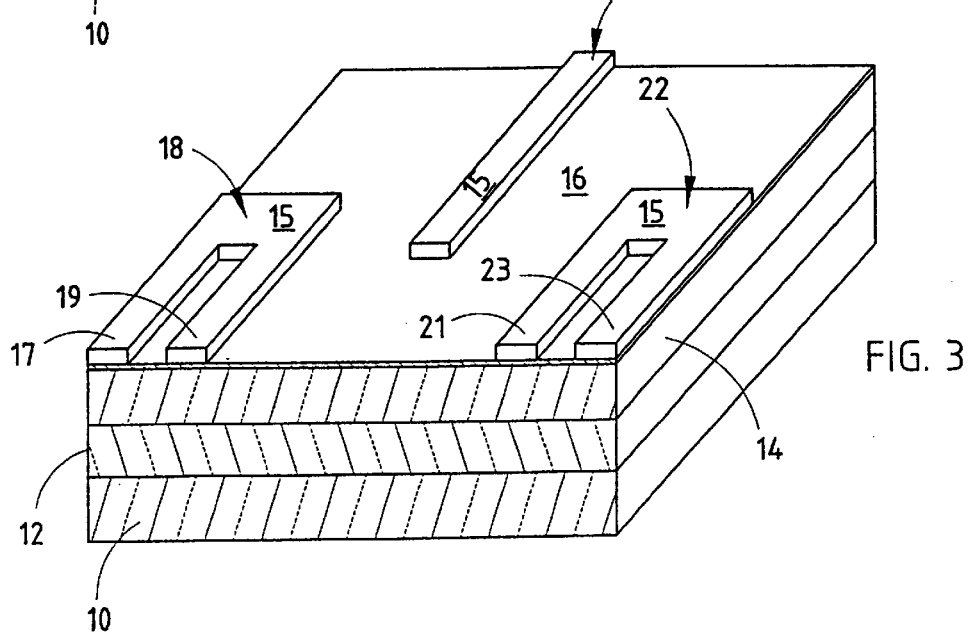
FIG. 3 is a schematic view of an additional step in the process of manufacturing a hybrid optical component according to the present invention.

Subsequently, as shown in FIG. 3, a pattern of photo-resist material 15 is deposited on metallic surface 16 utilizing a mask to define what ultimately will become standoff alignment elements 18 and 22, each including a pair of spaced-apart legs 17 and 19, and 21 and 23, respectively. As will be described in greater detail below, the patterned photo-resist layer 15 defines the shape and location of standoff alignment elements and a passive optical element 20, such as a waveguide, and their respective position. Thus, the standoff elements 18 and 22 will become precisely positioned in fixed relationship and in alignment with waveguide 20 during the printing of the patterned photo-resist layer 15 onto the metallic layer 16 of the structure shown in FIG. 3 and by the subsequent processing steps.

Figure 4:
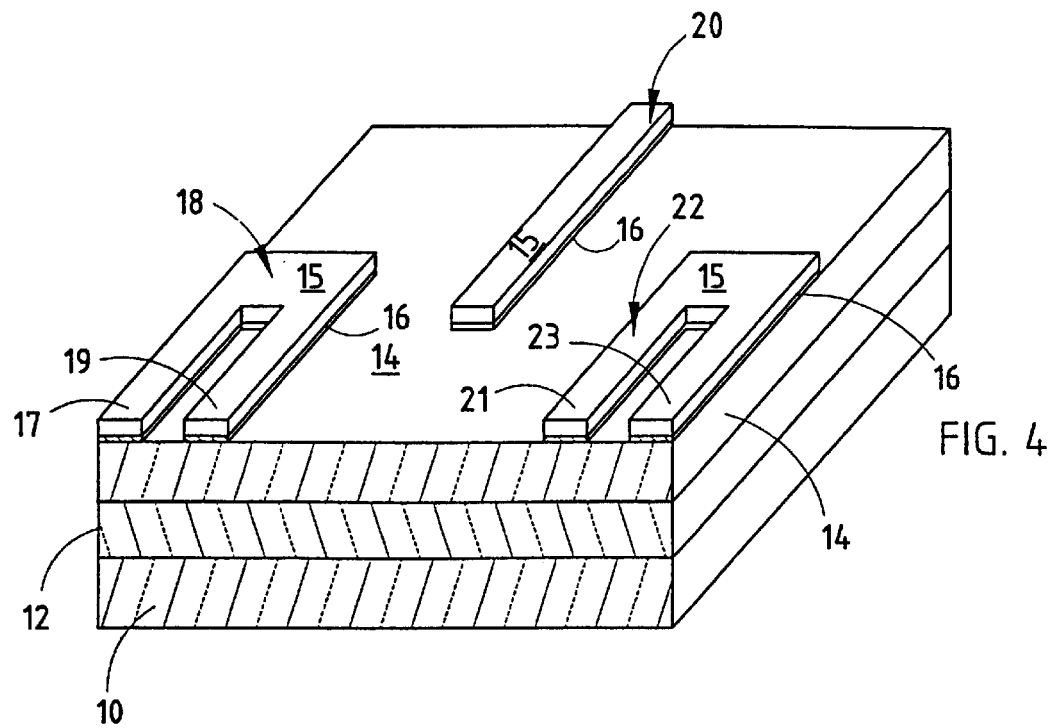
FIG. 4 is a schematic view of an additional step in the process of manufacturing a hybrid optical component according to the present invention.
Figure 5:
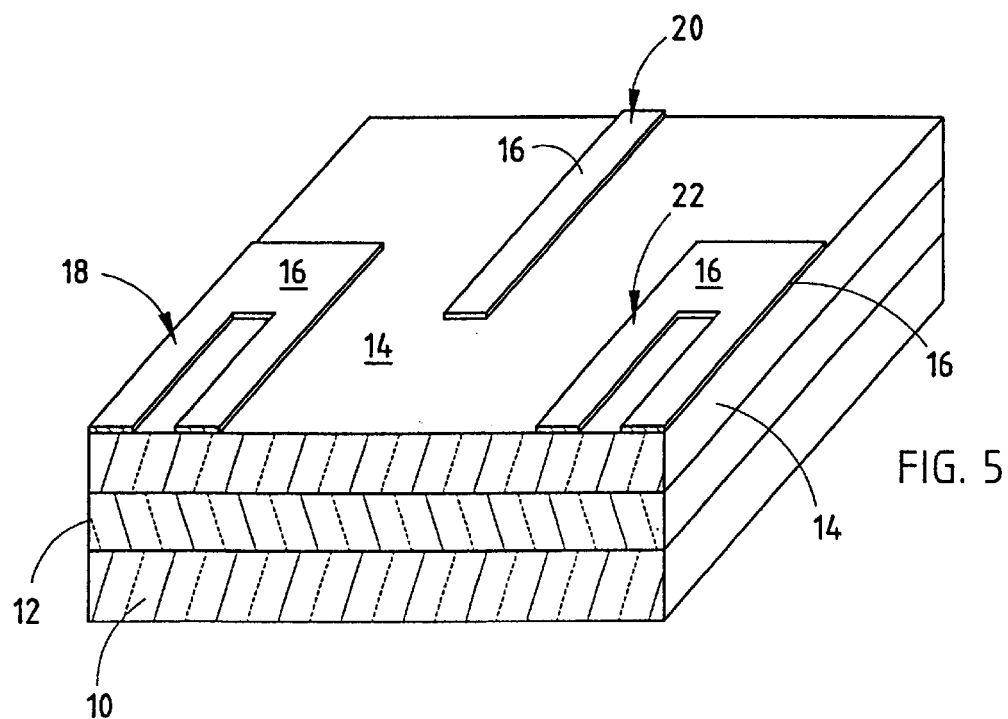
FIG. 5 is a schematic view of an additional step in the process of manufacturing a hybrid optical component according to the present invention.
Figure 6:
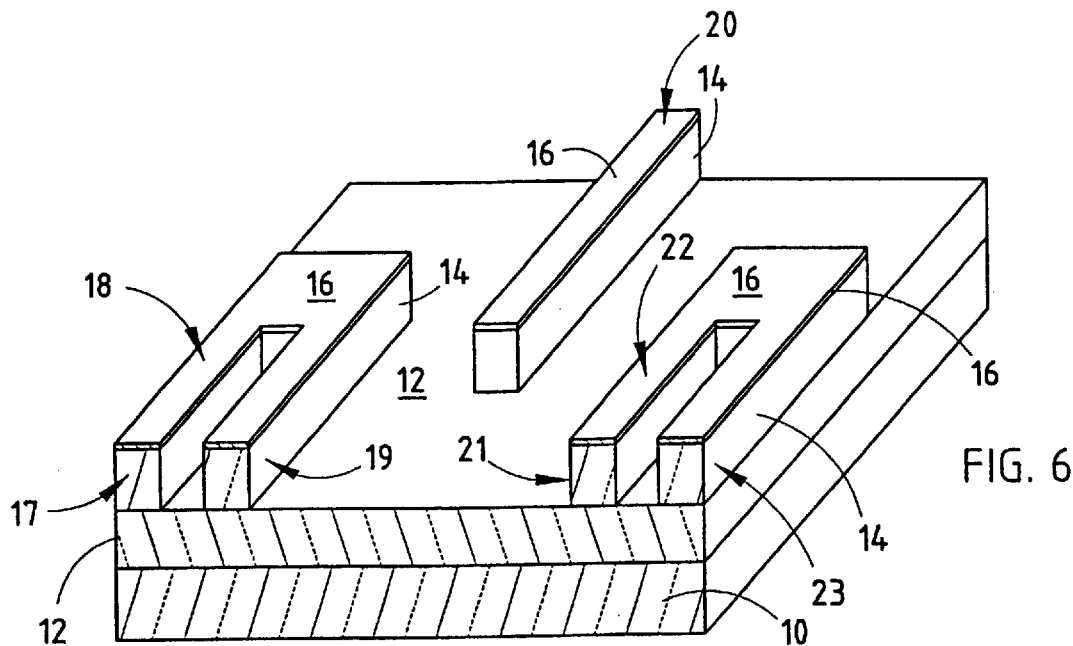
FIG. 6 is a schematic view of an additional step in the process of manufacturing a hybrid optical component according to the present invention.
Figure 7:
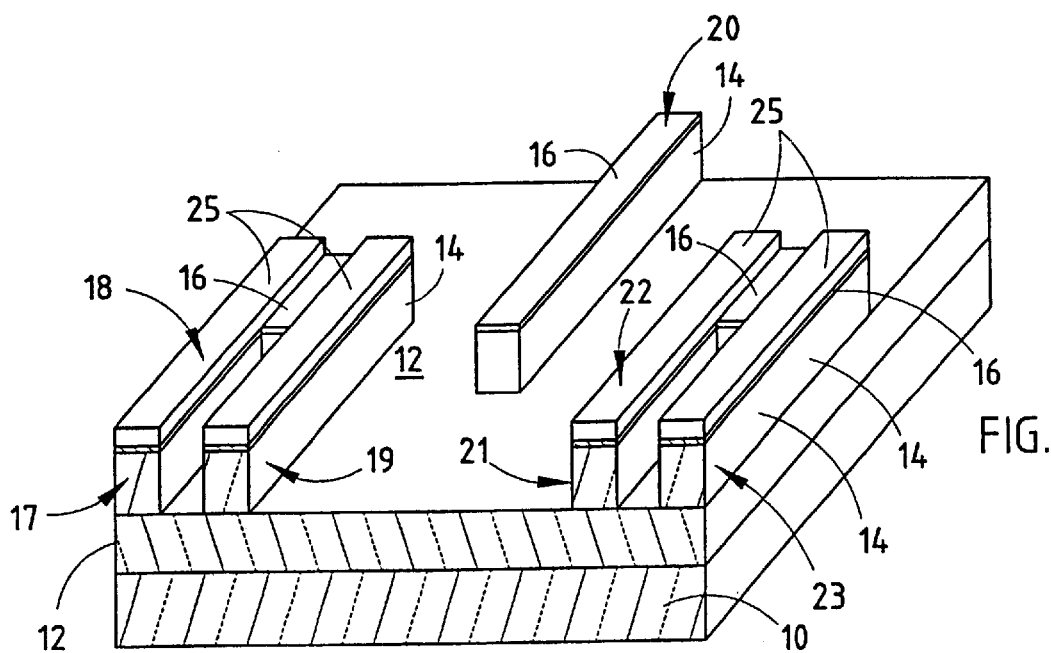
FIG. 7 is a schematic view of an additional step in the process of manufacturing a hybrid optical component according to the present invention.

The next step is illustrated in FIG. 4 and is the etching away of the exposed metallic layer 16 shown in FIG. 3 to expose the core material 14 with the metallic layer 16 underlying the photo-resist 15 defining elements 18, 20 and 22 remaining. Next, the photo-resist layer is removed as shown in FIG. 5 by the chemical washing of the photo-resist exposing the metallic mask corresponding to elements 18, 20 and 22 having the same pattern and relative alignment of the original photo-resist pattern only comprising the remaining exposed pattern of conductive material 16. As seen in FIG. 6, the core material 14 is then etched away, such as by reactive ion etching, resulting in the three-dimensional structure shown in FIG. 6 with the core material 14 remaining under the metallic surfaces 16 of standoff alignment element 18, waveguide 20 and standoff alignment element 22. The under-cladding layer 12 is now exposed in the areas surrounding waveguide 20 and elements 18 and 22. The under-cladding layer 12 can be partially etched.

Figure 8:
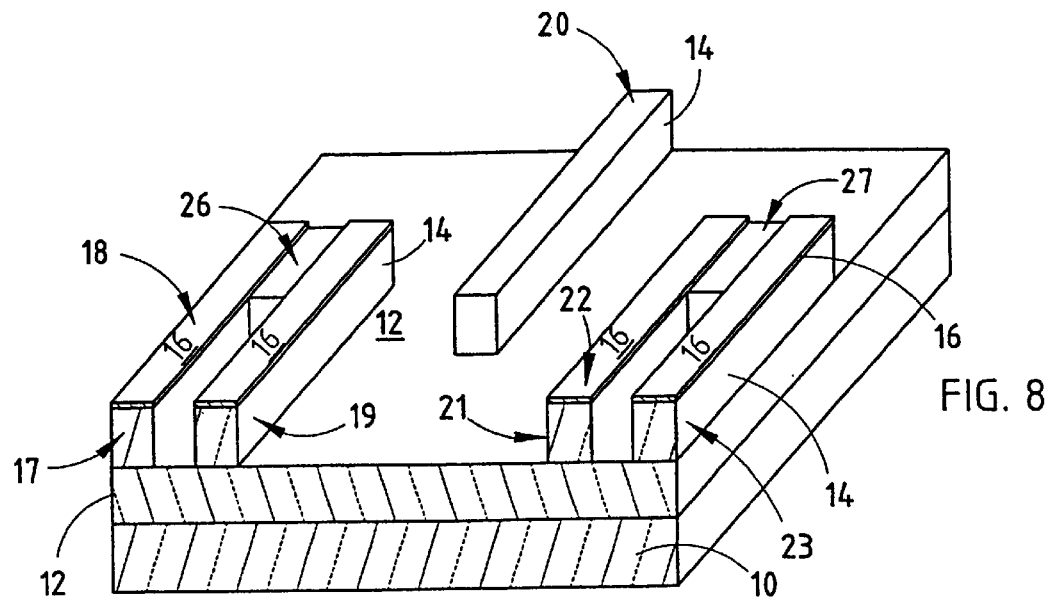
FIG. 8 is a schematic view of an additional step in the process of manufacturing a hybrid optical component according to the present invention.

Next, the upper surface of the parallel rectangular and spaced-apart legs 17 and 19 of standoff element 18 and legs 21 and 23 of standoff element 22 are coated with a photo-resist material 25 to protect the metallic surfaces thereon during the next step, shown in FIG. 8, in which the metallic surfaces 16 of the waveguide 20 and the waveguide overlap sections 26 and 27 of standoff elements 18 and 22, respectively, are etched away by conventional wet or dry etching. The photo-resist material 25 is then washed away such that the metallic surface 16 on legs 17, 19, 21 and 23 of standoff alignment elements 18 and 22, respectively, is exposed.

Figure 9:
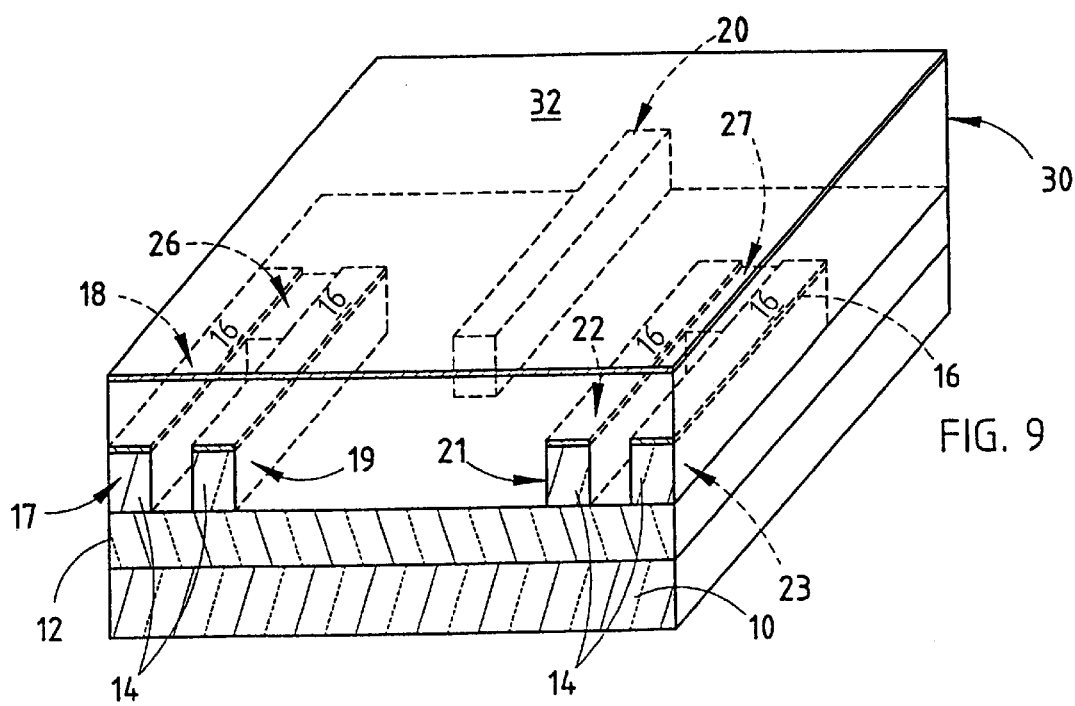
FIG. 9 is a schematic view of an additional step in the process of manufacturing a hybrid optical component according to the present invention.

An overclad layer 30 is next deposited by, for example, flame hydrolysis deposition over the structure of FIG. 8, as illustrated in FIG. 9. The overcladding 30 is silica with a dopant providing a similar index of refraction to that of the under-clad layer 12 but having a lower melting point, such as approximately 1240° C. as opposed to the melting point of the under-clad layer and substrates 10 and 12 of, for example, 1340° C. Thus, the flame hydrolysis deposition of the overcladding 30 does not affect the geometry of the substrate under-cladding, waveguide or standoff alignment elements previously formed and illustrated in FIG. 8. Subsequent to the overcladding, the top surface of the overclad layer 30 is coated with aluminum, chromium, or a silicon metallic layer 32 (FIG. 9) by conventional sputtering or evaporation techniques to cover the entire top surface of the overclad layer 30.

Figure 10:
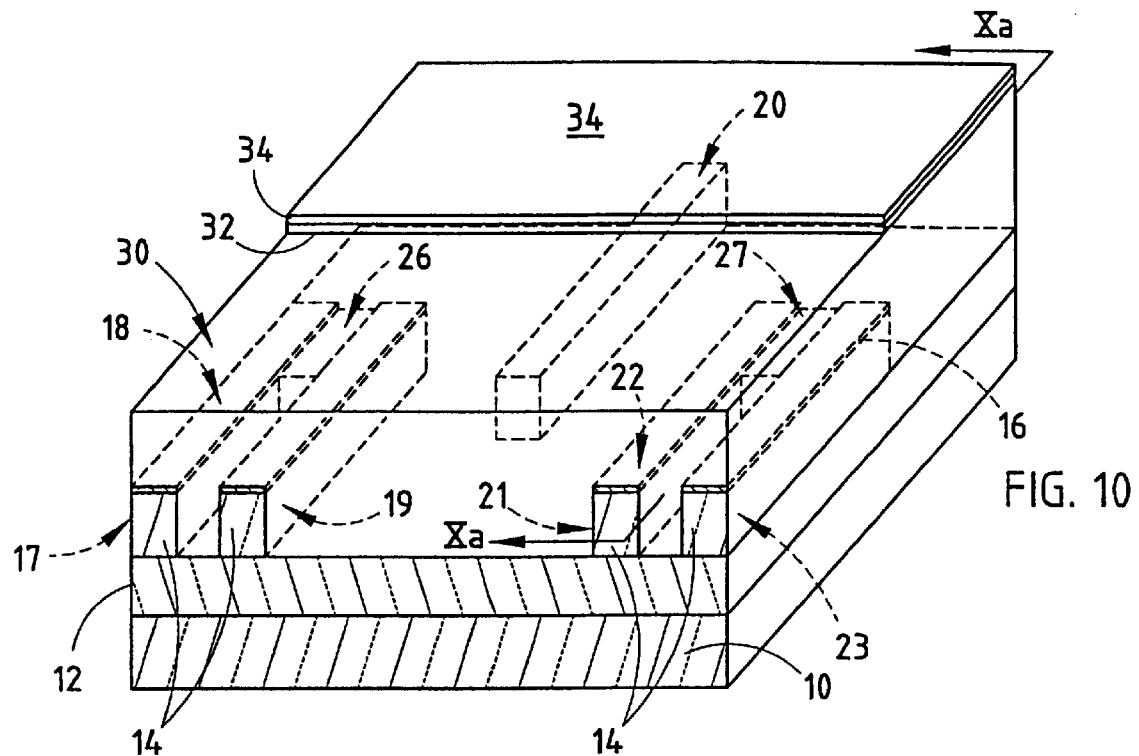
FIG. 10 is a schematic view of an additional step in the process of manufacturing a hybrid optical component according to the present invention.
Figure 10A:
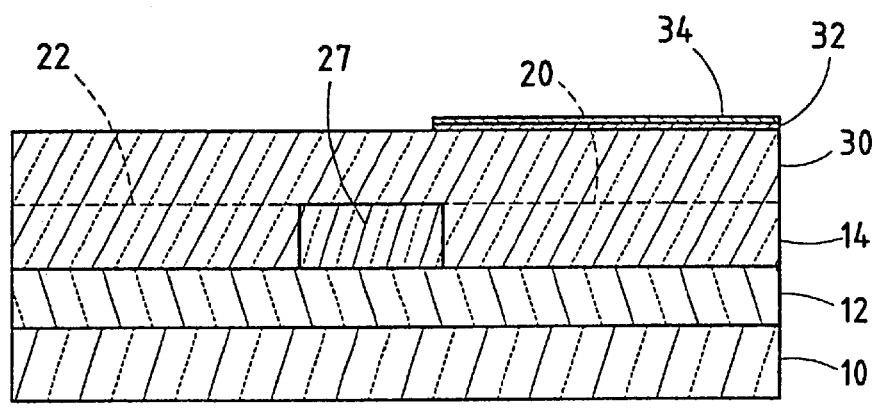
FIG. 10a is a cross-sectional view through section line Xa—Xa of FIG. 10.
Figure 11:
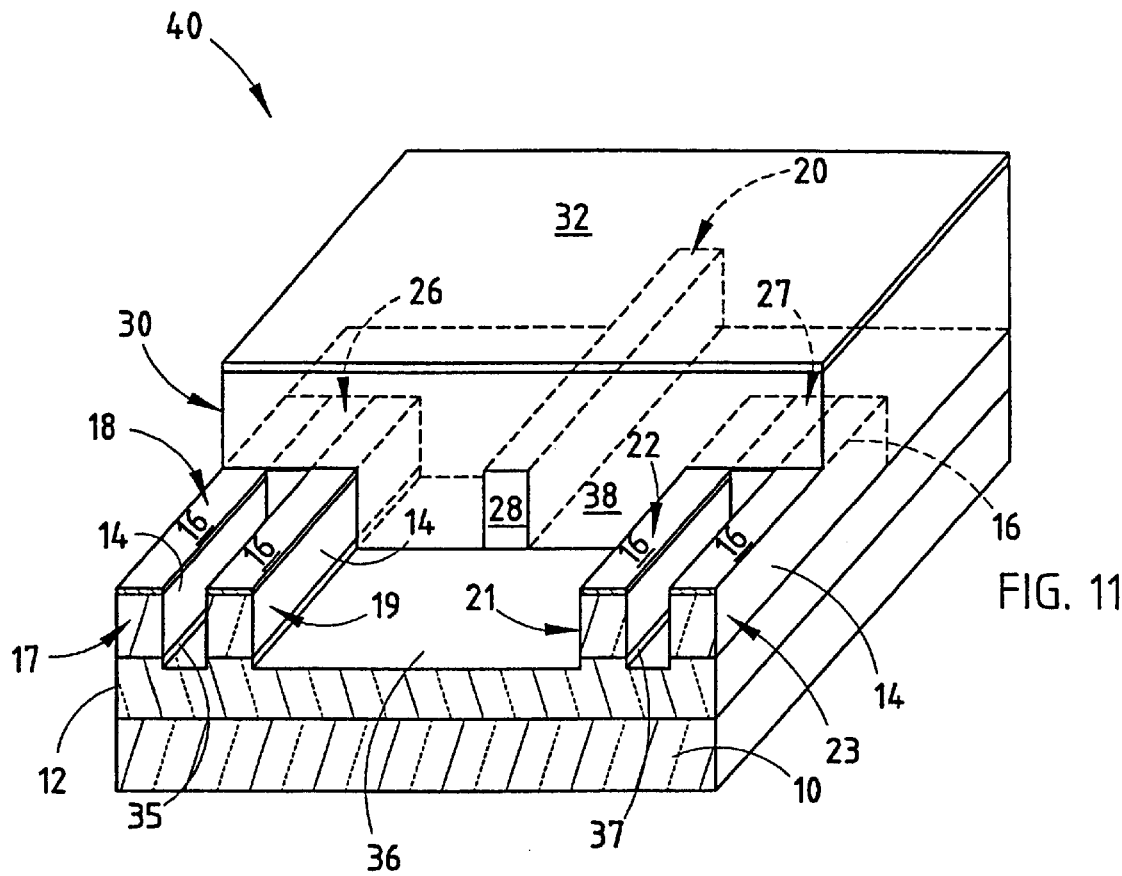
FIG. 11 is a schematic view of the resultant passive platform manufactured according to the method of the present invention.

Next, a rectangular pattern of photo-resist 34 is applied over the metallic layer 32 only at the rear of the structure shown in FIG. 9. Waveguide element 20 and overlap sections 26 and 27 are partially covered. The exposed metal surface 32, above waveguide element 20 and standoff elements 18 and 22, is then removed by wet or dry etching exposing the overclad layer 30, as seen in FIG. 10 and cross section FIG. 10a. The photo-resist 34 is subsequently washed away, exposing the metallic layer 32 previously protected by photo-resist layer 34. At the end of this process, the metallic layer 32 over a part of the elements 20, 26, and 27 is now exposed, and the overcladding 30 at the forward section of the structure over the standoff alignment elements 18 and 22 is exposed. The photo-resist masking 34 defines a precise boundary between the front and rear sections of the resulting structure which results, as described below, in a vertical wall 38 (FIG. 11). One key step of the process is to leave the mask in place during the core etching above the alignment elements before the overclad deposition. This embedded layer acts as a stop etch layer during the partial overclad etching.

As illustrated in FIG. 11, the uncovered overcladding 30 at the front of the passive platform 40 so formed is etched away, again using a conventional etching process such as reactive ion etching, to once again expose the parallel longitudinally extending legs 17 and 19 of standoff alignment element 18 and parallel longitudinally extending legs 21 and 23 of standoff element 22. The embedded layer 16 acts as a stop etch layer to protect standoff elements 17, 19, 21, and 23. The etching may extend somewhat deeper into the under-clad layer 12 to form channels 35 and 37 between standoff elements 17 and 19 and 21 and 23, respectively, and a wide channel 36 between legs 19 and 21. The reference surface for Z-axis alignment of the active device described below is the upper metallic exposed surface 16 of the standoff elements 18 and 22. The vertical end wall 38 of the remaining overcladding layer 30 is precisely formed during the etching to, as described below, provide Y-axis alignment of the active platform on the passive platform 40. The end surface 28 of waveguide 20 formed of the core material 14 may be coated with a titanium dioxide ($T_iO_2$) or other materials to reduce reflection when an active device, such as a solid state laser, is positioned on the passive platform as now described in connection with FIGS. 12 and 13.

Figure 12:
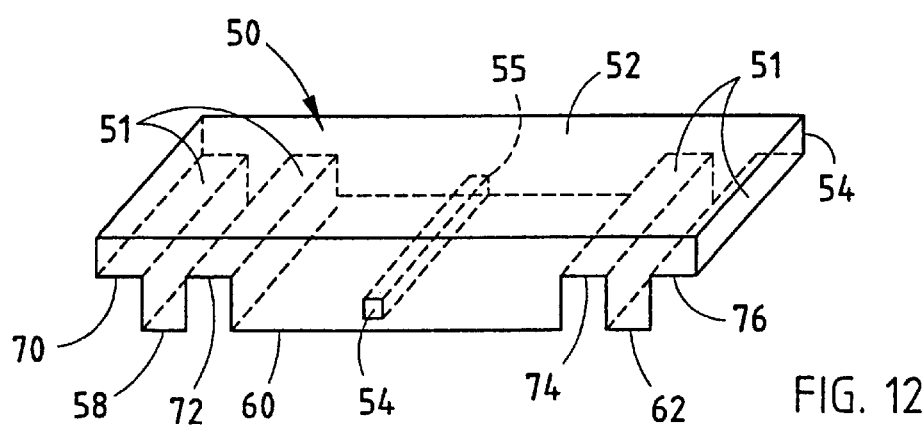
FIG. 12 is a schematic view of an active platform, including an active device which mates with the passive platform shown in FIG. 12.
Figure 13:
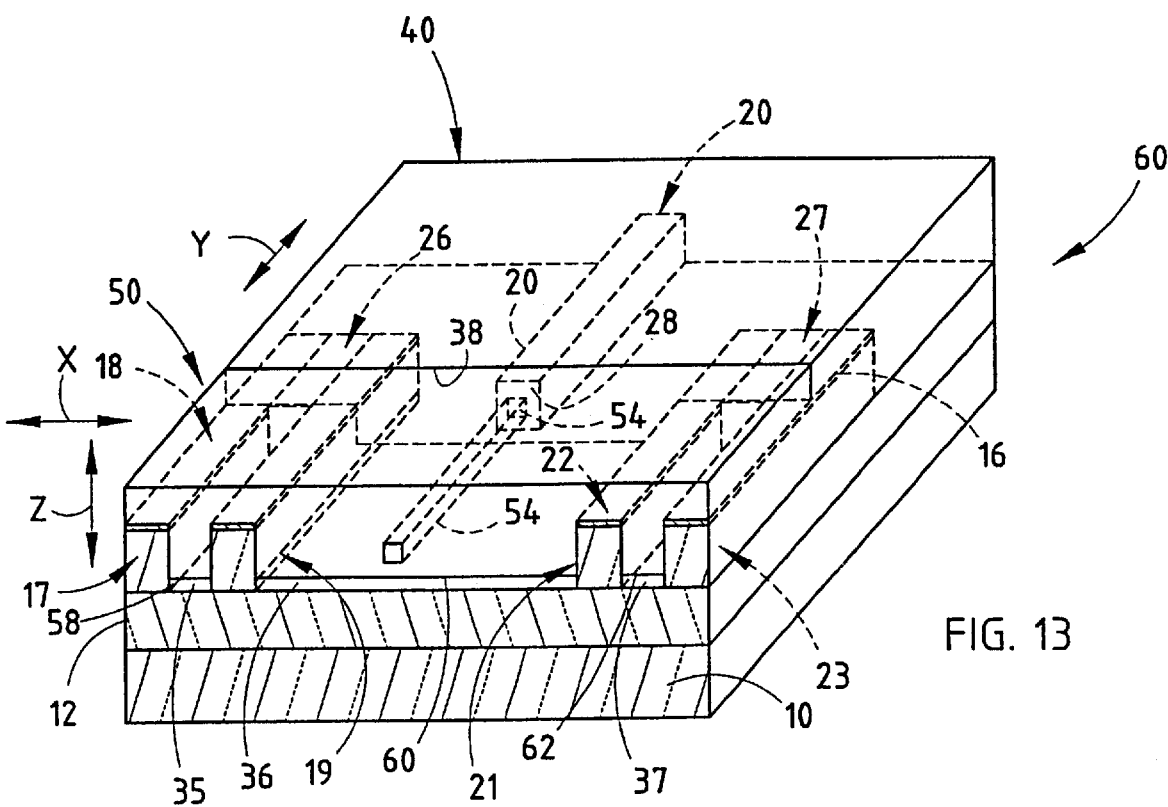
FIG. 13 is a schematic view of a hybrid optical component manufactured according to the present invention and including the active platform of FIG. 12 joined to the passive platform of FIG. 11.

An active platform 50 is shown in FIG. 12 which has alignment elements which are a mirror image of standoff alignment elements 18 and 22 of passive platform 40. Active platform 50 is made of compounds of amorphous materials of group III–V elements from the periodic table, for example, $I_nP$ and an active layer of $I_nG_aA_sP$ to form an embedded laser waveguide 54 which is centered therein and precisely aligned with alignment elements 58 and 62 comprising longitudinally extending, rectangular, downwardly projecting ridges which matingly fit within the channels 35 and 37 of the passive platform 40. The active platform 50 aligns with the passive platform 40 such that the active end 55 of laser waveguide 54 aligns and is centered with end 28 of waveguide 20, as seen in FIG. 13, when the active platform 50 is positioned on the passive platform 40 and bonded thereto by, for example, thermal-compression (in one embodiment) or by any other suitable means, such as conventional bonding agents. The active platform is made in such a way to provide mirror image inter-fitting alignment elements 58 and 62 which fit within channels 35 and 37 of platform 40 and channels 70, 72, 74, and 76 which receive legs 17, 19, 21 and 23, respectively, of the standoff alignment elements 18 and 22 of platform 40. The alignment elements of the active device are a mirror image of the alignment elements of the passive platform and are directly etched on the top surface of the active device.

The rear wall 52 of the active platform 50 abuts against and aligns with the front wall 38 of active platform 40 to provide Y-axis alignment as shown by arrow Y in FIG. 13, while the inter-fitting alignment elements and channels provide X-axis alignment as shown by arrow X in FIG. 13. The Z-axis alignment is achieved by the metallic surfaces 16 on top of standoff elements 18 and 22 fitting against the lower surfaces 51 of each of the channels 70, 72, 74, and 76, which are precisely etched to provide substantially centered alignment of the active laser waveguide 54 with waveguide 20. The mirror image alignment elements formed on the active platform 50 are formed by reactive ion beam etching or the like utilizing mirror image masking to that employed in the manufacturing of the passive platform 40.

The hybrid component 60, shown in FIG. 13, is illustrative only of the process and shows a hybrid component which includes a solid state laser 54 coupled to and aligned with waveguide 20. An optical circuit will include numerous other optical components which may be integrally formed at the same time as the waveguide 20 is formed and during the same processing steps. Since the positive alignment elements of the passive platform are self-aligned with the negative elements of the active platform and vice versa, X-axis alignment accuracy is provided by the precision of the formation positive/negative alignment elements, which is well within 0.5 $\mu$m. The Y-axis precision likewise is defined by the precision of alignment of the end walls 38 and 54 of the passive and active platforms, respectively, and also is within 0.5 $\mu$m. The Z-axis alignment precision is controlled by the etching depth of the surfaces of the active device and can readily be controlled within 0.1 $\mu$m utilizing standard reactive ion etching or reactive ion beam etching processes. Although the alignment elements disclosed in the preferred embodiment are parallel, generally rectangular extending projections and channels with integral end walls, such as walls 38 and 52, it is understood that the shape, placement, and number of the alignment elements can be varied as long as they provide inter-fitting surfaces between the passive platform and the active platform in X, Y, and Z directions. Thus, alignment elements may take the form of square, rectangular, or triangular blocks and similarly shaped receiving sockets.

With the method of the present invention, complex hybrid optical components can be fabricated to provide precise alignment between passive and active elements utilizing a cost effective manufacturing method. It will become apparent to those skilled in the art that various modifications to the preferred embodiment of the invention as described herein can be made without departing from the spirit or scope of the invention as defined by the appended claims.

The invention claimed is:

1. A method of manufacturing a hybrid optical component comprising the steps of:

providing a first substrate;

depositing a core on the first substrate;

masking and etching the core to define an optical element and at least one alignment element;

leaving the mask in place during the etching above at least a part of the alignment element;

overcladding the optical element to define a passive platform with a surface of the optical element exposed and in predetermined fixed relationship to the alignment element;

providing an active optical device;

masking and etching the active device to form an alignment element which is a mirror image of the alignment element of the passive platform; and coupling said active platform to said passive platform such that the respective alignment elements engage one another and said active optical device is positioned in aligned operative relationship to the exposed surface of the optical element on the passive platform.

2. The method of claim 1 wherein the core masking and etching steps comprise the steps of:

depositing a metallic layer onto the core;

applying a pattern of photo-resist onto said metallic layer to define the optical element and the alignment element;

etching away the exposed metallic layer;

removing the photo-resist; and etching away the exposed core to the substrate.

3. The method of claim 2 wherein said overcladding step comprises the steps of:

applying a photo-resist to the alignment element;

etching away the exposed metallic surface of the optical element;

removing the photo-resist on the alignment element;

depositing an overclad layer onto said core and substrate;

depositing a metallic layer over the exposed surface of the overcladding;

apply a photo-resist to the surface of the metallic layer overlying at least a part of the optical element;

etching the exposed metallic surface;

removing the photo-resist; and etching away the exposed overcladding.

4. The method of claim 1 wherein the core masking and etching defines a waveguide.

5. The method of claim 1 wherein the core masking and etching defines a pair of alignment elements in spaced relationship to each other.

6. The method of claim 1 wherein providing said first substrate provides a composite of a layer of $S_iO_2$ and an under-cladding layer of doped $S_iO_2$ having an index of refraction of from about 1.44 to about 1.55.

7. The method of claim 1 wherein the core depositing step is by flame hydrolysis deposition resulting in a core having an index of refraction of from about 1.5 to about 1.6.

8. The method of claim 1 wherein the providing of a second substrate provides a planar substrate of group III–V compounds.

9. The method of claim 1 wherein said coupling step includes thermal-compression to fix said active and passive platforms to one another.

10. A method of manufacturing a passive platform for a hybrid optical component comprising the steps of:

providing a substrate;

depositing a core on the substrate;

masking and etching the core to define a waveguide and at least one three-dimensional alignment element;

leaving the mask in place during the etching above a part of the three-dimensional alignment element; and overcladding the waveguide to define a passive platform having an end of the waveguide exposed and in predetermined fixed relationship to the alignment element.

11. A method of manufacturing an active platform for a hybrid optical component comprising the steps of:

providing an optical device from group III–V compounds; and masking and etching the group III–V compounds to form an alignment element which is a mirror image of an alignment element of a mating passive platform such that said active optical device can be positioned in aligned relationship to a passive optical device on the passive platform.

12. A hybrid optical component comprising:

a passive platform including an optical element having an exposed end and an alignment element positioned in predetermined fixed relationship to said exposed end of said optical element; and an active platform comprising an active device and a substrate having an alignment element formed therein as a mirror image to said alignment element of said passive platform such that said active platform precisely interfits with said passive platform to align said active device with said exposed end of said optical element.

13. The hybrid optical component of claim 12 wherein said optical element is a waveguide.

14. The hybrid optical component of claim 13 wherein said active device is a solid state laser.

15. A method of manufacturing a hybrid optical component comprising the steps of:

providing a first substrate;

depositing a core having an index of refraction greater than said first substrate onto the first substrate;

depositing a metallic layer having a thickness of from about 0.2 $\mu$m to about 5 $\mu$m onto the core;

applying a pattern of photo-resist onto said metallic layer to define an optical element and an alignment element;

etching away the exposed metallic layer;

removing the photo-resist;

etching away the exposed core to the substrate;

masking the alignment element;

overcladding the optical element to define a passive platform with a surface of the optical element exposed and in predetermined fixed relationship to the alignment element;

providing an active optical device;

masking and etching the active substrate to form an alignment element which is a mirror image of the alignment element of the passive platform; and coupling said active platform to said passive platform such that said active optical device is positioned in aligned relationship to the exposed surface of the optical element on the passive platform.

16. The method of claim 15 wherein said core depositing step is one of flame hydrolysis deposition and plasma-enhanced chemical vapor deposition.

17. The method of claim 16 wherein said etching of the core comprises reactive ion etching.

18. The method of claim 17 wherein said overcladding step comprises the steps of:

applying a photo-resist to the alignment element;

etching away the exposed metallic surface of the optical element;

removing the photo-resist on the alignment element; and depositing an overclad layer having an index of refraction less than that of said core.

19. The method of claim 18 wherein depositing of a metallic layer comprises depositing a layer of silicon.

* * * * *